US011558120B1

(12) United States Patent
Garcia et al.

(10) Patent No.: US 11,558,120 B1
(45) Date of Patent: Jan. 17, 2023

(54) METHOD FOR DESKEWING FPGA TRANSMITTER CHANNELS DIRECTLY DRIVING AN OPTICAL QPSK MODULATOR

(71) Applicant: United States of America as represented by the Administrator of NASA, Washington, DC (US)

(72) Inventors: Rafael A. Garcia, Greenbelt, MD (US); Eric Lidwa, Leesburg, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/490,941

(22) Filed: Sep. 30, 2021

(51) Int. Cl.
*H04B 10/00* (2013.01)
*H04B 10/556* (2013.01)

(52) U.S. Cl.
CPC ................. *H04B 10/556* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,031,847 A * | 2/2000 | Collins | ............... | H04L 7/10 370/508 |
| 6,999,891 B2 * | 2/2006 | Pepper | ............... | G01R 31/3171 370/503 |
| 7,036,037 B1 * | 4/2006 | Paul | ............... | G06F 1/12 713/401 |
| 7,467,056 B2 * | 12/2008 | Maniloff | ............... | H03K 19/1731 713/401 |
| 7,590,008 B1 * | 9/2009 | Roge | ............... | G11C 29/028 365/194 |
| 7,734,188 B2 * | 6/2010 | Kuwata | ............... | H04B 10/6971 375/228 |
| 7,870,444 B2 * | 1/2011 | Teo | ............... | G06F 13/4018 714/707 |
| 7,962,043 B2 * | 6/2011 | Conroy | ............... | H04B 10/5561 398/152 |
| 7,970,285 B2 * | 6/2011 | Conroy | ............... | H04B 10/58 398/154 |
| 8,682,180 B1 * | 3/2014 | Nimon | ............... | H04B 10/6971 398/208 |
| 8,705,605 B1 * | 4/2014 | Raman | ............... | H04L 1/243 375/220 |
| 8,731,073 B1 * | 5/2014 | Lee | ............... | H04L 25/14 375/220 |
| 8,855,498 B2 * | 10/2014 | Tanaka | ............... | H04B 10/5055 398/159 |
| 9,036,751 B1 * | 5/2015 | Wang | ............... | H04B 10/07 375/348 |

(Continued)

OTHER PUBLICATIONS

OIF, "Pluggable Optics for Coherent Systems: The CFP2-ACO Interface," Optical Internetworking Forum, 2017, 4 pages, Web, <https://www.oiforum.com/wp-content/uploads/2019/01/OIF_CFP2-ACO_White_Paper_2017.pdf>.

*Primary Examiner* — Agustin Bello
(74) *Attorney, Agent, or Firm* — Christopher O. Edwards; Bryan A. Geurts; Helen M. Gaius

(57) ABSTRACT

A Field Programmable Gate Array ("FPGA") transmitter reliability directly drives an optical modulator. Each time the FPGA is powered up, the transmitters are aligned using optical feedback for coarse and fine alignments. The fine alignment may be executed using a built-in transmitter phase interpolator Parts-Per-Million ("PPM") controller.

20 Claims, 6 Drawing Sheets

(56) References Cited

U.S. PATENT DOCUMENTS

| | | | | |
|---|---|---|---|---|
| 9,184,834 B1* | 11/2015 | Zhang | H04B 10/50577 |
| 9,749,057 B2* | 8/2017 | Yue | H04B 10/5057 |
| 9,998,232 B2* | 6/2018 | Yue | H04B 10/516 |
| 10,038,498 B1* | 7/2018 | Fan | H04B 10/532 |
| 10,284,202 B1* | 5/2019 | Gunn | H03K 19/17788 |
| 10,498,459 B2* | 12/2019 | Nomura | H04B 10/58 |
| 10,547,408 B2* | 1/2020 | He | H04B 10/616 |
| 10,574,362 B2* | 2/2020 | Chen | H04B 10/6164 |
| 10,587,294 B1* | 3/2020 | Arabaci | H03H 17/0266 |
| 10,608,746 B2* | 3/2020 | Zhuge | H04B 10/0799 |
| 10,720,999 B2* | 7/2020 | Tamoney, Jr. | H04B 10/0799 |
| 10,749,756 B2* | 8/2020 | Lackey, Jr | H04L 7/06 |
| 11,108,462 B2* | 8/2021 | Xu | H04B 10/077 |
| 11,314,107 B2* | 4/2022 | Doppalapudi | H04B 10/505 |
| 11,398,844 B1* | 7/2022 | Perumana | H04B 1/04 |
| 2004/0064660 A1* | 4/2004 | Lyons | G06F 13/4243 |
| | | | 711/167 |
| 2004/0120418 A1* | 6/2004 | Pasternak | H04L 27/14 |
| | | | 375/272 |
| 2004/0252684 A1* | 12/2004 | Evans | H04L 49/30 |
| | | | 709/201 |
| 2004/0264613 A1* | 12/2004 | Buchmann | H04L 7/0337 |
| | | | 375/354 |
| 2007/0088991 A1* | 4/2007 | Shin | H04L 1/242 |
| | | | 714/700 |
| 2008/0031311 A1* | 2/2008 | Haas | H04L 25/14 |
| | | | 375/221 |
| 2008/0031312 A1* | 2/2008 | Haas | H04L 1/243 |
| | | | 375/221 |
| 2008/0126888 A1* | 5/2008 | Haas | H04L 25/14 |
| | | | 714/E11.023 |
| 2008/0175586 A1* | 7/2008 | Perkins | H04B 10/27 |
| | | | 398/2 |
| 2008/0222594 A1* | 9/2008 | Maniloff | H04L 25/14 |
| | | | 326/39 |
| 2009/0063889 A1* | 3/2009 | Dada | H04L 25/14 |
| | | | 713/503 |
| 2009/0116839 A1* | 5/2009 | Kikuchi | H04J 14/02 |
| | | | 398/79 |
| 2009/0129455 A1* | 5/2009 | Kim | H04L 25/14 |
| | | | 375/228 |
| 2012/0063556 A1* | 3/2012 | Hoang | H03L 7/183 |
| | | | 375/371 |
| 2012/0207229 A1* | 8/2012 | Ananthaswamy | H04L 27/367 |
| | | | 375/259 |
| 2012/0250792 A1* | 10/2012 | Khatana | H04B 10/5561 |
| | | | 375/308 |
| 2012/0268191 A1* | 10/2012 | Ananthaswamy | H04L 25/03885 |
| | | | 327/358 |
| 2015/0063825 A1* | 3/2015 | Yamase | H04L 27/20 |
| | | | 398/154 |
| 2016/0164725 A1* | 6/2016 | Wu | H04L 12/40 |
| | | | 370/257 |
| 2018/0019770 A1* | 1/2018 | Lange | H04B 1/40 |
| 2019/0342028 A1* | 11/2019 | He | H04B 10/532 |
| 2019/0377846 A1* | 12/2019 | Hanchinal | G06F 13/4027 |
| 2020/0220391 A1* | 7/2020 | Zeine | H02J 50/20 |
| 2021/0111803 A1* | 4/2021 | McNicol | H04B 10/614 |
| 2022/0247433 A1* | 8/2022 | Perumana | H04B 17/345 |

\* cited by examiner

METHOD FOR DESKEWING FPGA TRANSMITTER CHANNELS DIRECTLY DRIVING AN OPTICAL QPSK MODULATOR

ORIGIN OF INVENTION

The invention described herein was made in the performance of work under a NASA contract and by an employee of the United States Government and is subject to the provisions 51 U.S.C. § 20135 (b), Public Law 111-314, § 3 (124 Stat. 3330, 51 U.S.C. Chapter 201), and may be manufactured and used by or for the Government or for governmental purposes without the payment of any royalties thereon or therefore.

STATEMENT REGARDING FEDERALLY SPONSORED RESEARCH OR DEVELOPMENT CHOOSE ONE OF THE FOLLOWING AND REMOVE THIS LANGUAGE

For Government employee only inventions: The invention described herein was made by an employee/employees of the United States Government and may be manufactured and used by or for the Government of the United States of America for governmental purposes without the payment of any royalties thereon or therefore.

For joint invention of Government Employee and Non-Federal Party Outside of any Funding Agreement of Other Arrangement With NASA: The invention described herein was made in part by an employee/employees of the United States Government and may be manufactured and used by and for the Government of the United States for governmental purposes without the payment of any royalties thereon or therefore.

For small business or nonprofit contractor inventions: The invention described herein was made in the performance of work under a NASA contract and is subject to the provisions of Public Law 96-517 (35 U.S.C. § 202) in which the contractor elected not to retain title.

For Joint Government Employee and small business or nonprofit Contractor Inventions: The invention described herein was made in the performance of work under a NASA contract and by an employee/employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

For Large Business Inventions: The invention described herein was made in the performance of work under a NASA contract and is subject to the provisions of the National Aeronautics and Space Act, Public Law 111-314, § 3 (124 Stat. 3330, 51 U.S.C. Chapter 201).

For Joint Government Employee and Large business Inventions: The invention described herein was made in the performance of work under a NASA contract and by an employee/employees of the United States Government and is subject to the provisions of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

Joint Large Business and small business or nonprofit organization inventions: The invention described herein was made in the performance of work under a NASA contract and is subject to the provisions of the National Aeronautics and Space Act, Public Law 111-314, § 3 (124 Stat. 3330, 51 U.S.C. Chapter 201) and 35 U.S.C. § 202. In accordance with 35 U.S.C. § 202, the contractor elected not to retain title.

Joint Government, Large Business, Small business or Nonprofit Organization Invention: The invention described herein was made in the performance of work under NASA contracts and by an employee/employees of the United States Government and is subject to the provisions of the National Aeronautics and Space Act, Public Law 111-314, § 3 (124 Stat. 3330, 51 U.S.C. Chapter 201) and 35 U.S.C. § 202, and may be manufactured and used by or for the Government for governmental purposes without the payment of any royalties thereon or therefore. In accordance with 35 U.S.C. § 202, the contractor elected not to retain title.

BACKGROUND OF THE INVENTION

For optical modulator drivers, efforts have been made to minimize timing skew in the transmitters to reduce channel distortions. Known approaches to limiting timing skew may include providing tight tolerances on the design of the path lengths and/or the use of matched Digital-to-Analog Converters ("DACs") or modulator drivers with built-in channel deskewing provisions.

BRIEF SUMMARY OF THE INVENTION

An FPGA transmitter according to the present disclosure may directly drive the optical modulator without DACs or external drivers. The FPGA may be configured such that, each time it is powered up, the high-speed transmitters initially have indeterminate relative timing alignment. The present disclosure provides a way to reliably align a plurality of transmitters within, for example, 100 ps of each other using a built-in transmitter phase interpolator Parts-Per-Million ("PPM") controller of the FPGA and feedback from the optical transceiver.

Another aspect of the present disclosure is a method of deskewing Field Programmable Gate Array ("FPGA") transmitter channels driving an optical Quadrature Phase Shift Keying ("QPSK") modulator of an optical transceiver having a plurality of optical modulators having optical transmitter ports and a plurality of optical receiver ports. Each optical receiver port may be operably connected to an optical receiver that is, in turn, operably connected to an Analog-to-Digital Converter (ADC) that is configured to provide electrical input signals to the FPGA. The FPGA may include a plurality of transmitter phase interpolator Parts-Per-Million (PPM) controllers and PPM registers and a plurality of transmitters. Each transmitter pair defines a channel pair, and produces positive and negative components of a lane providing electrical output signals.

The method may include operably connecting pairs of FPGA transmitters to pairs of baluns, which may form a passive balun network. The positive terminals of each pair of FPGA transmitters may be coupled to 0° and 180° inputs of a first balun of each pair of baluns, and negative terminals of each pair of FPGA transmitters may be coupled to 0° and 180° inputs of a second balun of each pair of baluns. The method may further include providing an optical loopback path from the optical transmitter ports to corresponding optical receiver ports. The outputs of each balun of each pair of baluns may be operably coupled to inputs of an optical modulator whereby each optical modulator is driven by a pair of FPGA transmitters via a pair of baluns to define a lane. The method may further include forming a single virtual ADC FPGA by summing the absolute values of all ADCs whereby the single virtual ADC provides a plurality of samples.

The method may also include performing coarse time alignment of optical signals from the optical modulators, followed by fine time alignment of optical signals from the optical modulators for each lane. The method may further include selecting pairs of lanes, and, for each pair of lanes, performing coarse time alignment followed by fine time alignment.

Initialization for coarse time alignment for each lane may include setting outputs of the transmitter pair to a same known value, and setting outputs of all other transmitters to zero, and setting all PPM registers of the FPGA corresponding to the transmitters undergoing alignment to zero. Coarse time alignment of each lane may include repeatedly circularly shifting a second channel output by at least one bit relative to a first channel output to determine a selected offset having a minimum standard deviation, and circularly shifting the second channel output back by at least one circular shift from the selected offset to provide a coarse alignment shift.

Fine alignment of each lane may include utilizing shifts in the transmitter phase interpolator PPM controllers to determine an offset having the smallest deviation, followed by setting the PPM register to the offset having the smallest deviation.

Coarse time alignment and fine time alignment may be conducted for each lane whereby each pair of FPGA transmitters is aligned and corresponds to XI: X-polarity in-phase, XQ: X-polarity quadrature, YI: Y-polarity in-phase, and YQ: Y-polarity quadrature.

Coarse time alignment for each pair of lanes may include initialization, wherein the initialization includes setting a selected pair of lanes to have a same known output, setting all lanes other than the selected pair of lanes to output zeros, and determining the maximum possible coarse and fine shift values from the single-lane alignments. Coarse time alignment for each pair of lanes may further include selecting a threshold and executing a bit-shift sweep on a selected pair of lanes until the pattern wraps around, wherein a record of pulse widths is created at each step by counting a number of samples above the threshold. A minimum number of samples above the threshold may occur when pulses from the two channels overlap. Coarse time alignment for each pair of lanes may further include selecting an optimum shift at which there is a minimum number of samples above the threshold.

Fine time alignment of each pair of lanes may include adjusting the phase interpolator PPM channels and recording samples above the threshold, wherein, preferably, only the positive terminals of two of the four channels are driven at a time, and an optimum alignment is selected at which a minimum number of samples below the threshold occurs. The coarse and fine time alignment are preferably repeated for all lanes.

Another aspect of the present disclosure is a method of deskewing Field Programmable Gate Array ("FPGA") transmitter channels driving an optical Quadrature Phase Shift Keying ("QPSK") modulator of an optical transceiver having a plurality of optical modulators having optical transmitter ports and a plurality of optical receiver ports. Each optical receiver port may be operably connected to an optical receiver that may be, in turn, operably connected to an Analog-to-Digital Converter (ADC) providing electrical input signals to the FPGA. The FPGA may include a plurality of transmitter phase interpolator Parts-Per-Million (PPM) controllers and PPM registers and a plurality of transmitters. Each transmitter pair defines a channel pair, and produces positive and negative components of a lane providing electrical output signals. Pairs of FPGA transmitters may be coupled to pairs of baluns, each balun having a channel output whereby time offsets in pulses having substantially identical sequences of 1s and 0s of each FPGA transmitter of each transmitter pair cause differences in channel outputs of each balun of each pair, whereby the differences in channel outputs are related to misalignment of the channel outputs of each transmitter pair. The method may further include performing a single-lane course alignment for each lane by causing the FPGA transmitters of each pair to generate pulses having substantially identical sequences of 1s and 0s. The method may further include repeatedly bit-shifting pulses of a second channel output of each pair relative to a first channel output of each pair to form a plurality of offsets and corresponding differences in channel outputs. The method may further include selecting an optimum coarse offset (or an offset that is within a few bits of the optimum coarse offset) corresponding to differences in channel outputs indicating that the first and second channels are coarsely aligned. The method further includes performing a single-lane fine alignment for each lane utilizing the optimum coarse offset and the PPM controllers and PPM registers of the FPGA.

These and other features, advantages, and objects of the present invention will be further understood and appreciated by those skilled in the art by reference to the following specification, claims, and appended drawings.

DETAILED DESCRIPTION OF THE INVENTION

Figure 1:
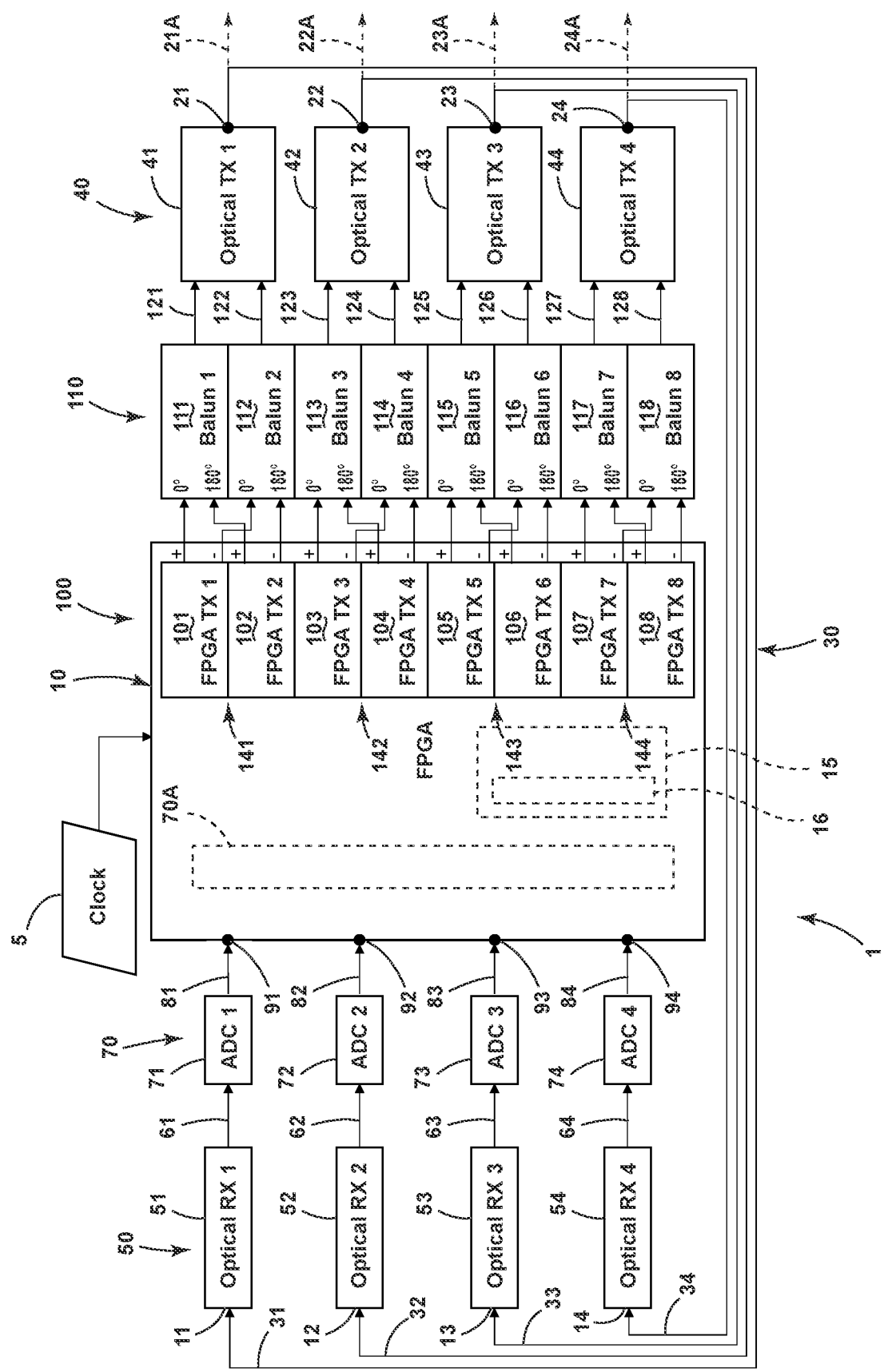
FIG. 1 is a schematic diagram of portions of an optical transceiver including an FPGA and optical drivers for a QPSK modulator.

For purposes of description herein, the terms "upper," "lower," "right," "left," "rear," "front," "vertical," "horizontal," and derivatives thereof shall relate to the orientation of FIG. 1. However, it is to be understood that various alternative orientations and step sequences, except where expressly specified to the contrary. It is also to be understood that the specific devices and processes illustrated in the attached drawings, and described in the following specification, are simply exemplary embodiments of the concepts defined in the appended claims. Hence, specific dimensions and other physical characteristics relating to the embodiments disclosed herein are not to be considered as limiting, unless the claims expressly state otherwise.

With reference to FIG. 1, a device or system 1 may be configured to implement a deskewing process according to an aspect of the present disclosure. System 1 may comprise an optical transceiver including a Field Programmable Gate Array ("FPGA") 10, a plurality of optical receiving ports 11-14, and a plurality of optical driver ports 21-24. In general, during normal operation (e.g., after deskewing) the FPGA 10 may be configured as an input to optical drivers 41-44 to provide QPSK signals 21A-24A that may be transmitted through, for example, an optical fiber. It will be understood that optical drivers 41-44 may comprise drivers of a known polarization multiplexed IQ transmitter.

In order to implement a deskewing process according to an aspect of the present disclosure, the optical receiving ports 11-14 may be operably connected or coupled to the optical driver ports 21-24 by an optical loopback 30 comprising optical connectors 31-34, respectively. Optical connectors 31-34 may comprise optical fibers, or optical connectors 31-34 may comprise a fiber-Bragg grating/circular tuned for a special loopback laser wavelength, wherein transmit lasers (not separately shown) of optical drivers 41-44 are tuned to this new wavelength for alignment purposes.

System 1 preferably includes an optical receiver 50 comprising optical receivers 51-54 that provide differential signals 61-64, respectively, to an Analog-to-Digital Converter ("ADC") 70 comprising individual ADCs 71-74, respectively. The ADCs 71-74 provide signals 81-84 to inputs 91-94 of FPGA 10, respectively. It will be understood that differential signals 61-64 may generally correspond to XIP, XIN, XQP, XQN, YIP, YIN, YQP, and YQN signals of a known dual polarization Intradyne Coherent Receiver ("ICR") of known CFP2-ACO interfaces.

FPGA 10 includes an FPGA transmitter 100 comprising a plurality of FPGA transmitters 101-108 having positive (+) and negative (−) outputs that are operably connected to 0° and 180° inputs of baluns 111-118, respectively, of balun network 110. Outputs 121-128 of baluns 111-118, respectively, are input to optical drivers 41-44. As discussed in more detail below, the baluns 111-118 convert the eight high-speed outputs from FPGA transmitters 101-108 into four tri-level differential signals for the X/Y polarity I/Q input channels of the optical drivers 41-44. It will be understood that the present disclosure is not limited to an FPGA having eight transmitters, and the present disclosure is also not limited to a single FPGA.

In order to implement deskewing, the samples from the ADCs 71-74 (XI/XQ/YI/YQ) are aligned. This is because, as discussed in more detail below, the deskewing process may utilize the samples of the four ADCs 71-74 for feedback. To overcome phase/polarity distortions during the deskewing process, the absolute value of all four ADCs 71-74 may be summed together, creating a single virtual ADC 70A. The single virtual ADC 70A may be implemented by the FPGA 10 or other suitable means. A stable reference clock 5 is also utilized for the FPGA transceivers.

FPGA 10 may comprise a commercially available Xilinx® device that includes a TX Phase Interpolator Parts-Per-Million ("PPM") Controller 15 including a plurality of Parts-Per-Million ("PPM") registers 16. As discussed in more detail below, the PPM controller 15 may be utilized to implement fine time alignment of optical drivers 41-44 following coarse time alignment of optical drivers 41-44.

In general, upon power up of system 1, the outputs of optical drivers 41-44 are not initially time-aligned (i.e., the outputs are skewed relative to one another). In an effort to reduce skew, existing designs may rely on tight tolerances in the design of the path links and/or the use of matched DACs or modulator drivers with built-in channel deskewing provisions.

In contrast to known designs, FPGA transmitter system 1 may be configured to directly drive the optical driver ports 21-24 without DACs or external drivers. One aspect of the present disclosure involves reliably aligning a plurality (e.g., eight) transmitters 101-108 within, for example, 100 ps of each other using the built-in transmitter phase interpolator PPM controller 15 and feedback from the optical drivers 41-44.

Prior to implementing a deskewing process, a stable reference clock 5 (FIG. 1) may be operably connected to FPGA 10. Also, appropriate amplitude drive levels that meet input specifications of the optical drivers 41-44 may be established (if necessary). Also, the data patterns on optical drivers 41-44 are set to wide pulses. Although various pulses may be utilized, an example of a suitable pulse comprises a repeating pattern of 32 consecutive 1s followed by 512 consecutive 0s. It will be understood that this is merely an example of suitable pulses, and the present disclosure is not limited to a specific pulse. Thus, virtually any suitable pulse length or configuration may be utilized. The deskewing process described in more detail below involves causing the FPGA 10 to produce wide pulses from optical drivers 41-44, and the wide pulses are selectively bit-shifted relative to one another (preferably one bit per shift) until the combined output of the optical drivers 41-44 indicates that the drivers being aligned are at an optimum alignment. It will be understood that the optical loopback path 30 is typically only utilized during the deskewing process upon power up of FPGA 10. The QPSK utilized during normal operation of FPGA 10 after deskewing (decouple) are designated 21A-24A in FIG. 1. Various devices (not shown) may be utilized to bypass (decouple) optical loopback path 30. Also, during normal operation of FPGA 10, feedback via optical loopback path 30 is preferably disabled, and various inputs (not shown) may be provided to the FPGA 10 after deskewing as required for a particular application.

Referring again to FIG. 1, the positive (+) terminals of adjacent pairs of FPGA transmitters 101-108 are fed into the 0° and 180° inputs of a balun 111-118, creating a positive pulse when the 0° input is driven and a negative pulse when the 180° input is driven. The negative (−) terminals of the FPGA transmitters 101-108 are similarly connected to another balun 111-118 to complete a differential pair of channels corresponding to a lane. In the example of FIG. 1, the positive (+) terminal of FPGA transmitter 101 is operably connected to the 0° input of balun 111, and the positive (+) terminal of FPGA transmitter 102 is operably connected to the 180° input of balun 111. Also, the negative (−) terminal of FPGA transmitter 101 is operably connected to the 0° input of balun 112, and the negative (−) terminal of FPGA transmitter 102 is operably connected to the 180° input of balun 112 to form a differential pair of differential channels 121 and 122 corresponding to a first lane 141. Lane 141 is comprised of the differential pair of channels 121 and 122. Similarly, FPGA transmitters 103 and 104 are operably interconnected with baluns 113 and 114 to form a differential pair of channels 123 and 124 corresponding to a second lane 142. FPGA transmitters 105 and 106 are operably interconnected with baluns 115 and 116 to form a differential pair of channels 125 and 126 corresponding to a lane 143, and FPGA transmitters 107 and 108 are operably interconnected with baluns 117 and 118 to form a fourth differential pair of channels 127 and 128 corresponding to a fourth lane 144.

Figure 1A:
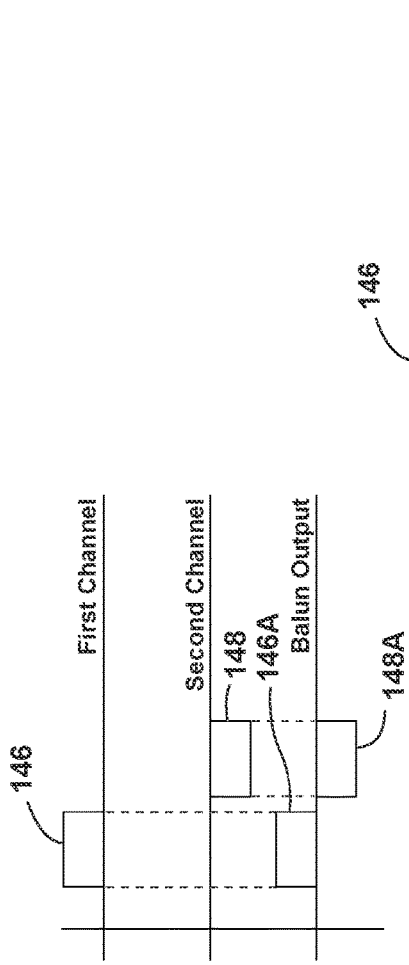
FIG. 1A is a graph showing balun output resulting from first and second transmitter inputs when implementing the process in FIG. 3.
Figure 1B:
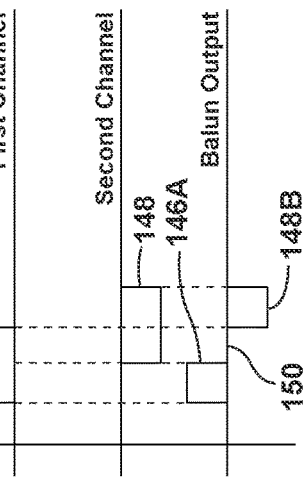
FIG. 1B is a graph showing balun output resulting from first and second transmitter inputs when implementing the process of FIG. 3.
Figure 1C:
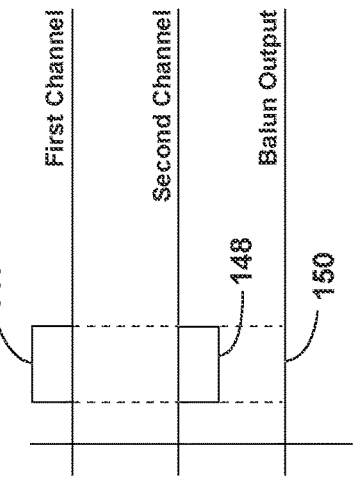
FIG. 1C is a graph showing balun output resulting from first and second transmitter inputs when implementing the process of FIG. 3.

The output of the baluns 111-118 is generally shown in FIGS. 1A-1C. The vertical axes represent pulse strength, and the horizontal axes represent time. As shown in FIG. 1A, if positive and negative pulses 146 and 148 do not overlap in time, the balun outputs pulses 146A and 148A that are substantially identical to the input pulses 146 and 148, respectively. However, as shown in FIG. 1B, if the pulses 146 and 148 partially overlap in time, the balun output includes a positive pulse 146A having reduced duration relative to pulse 146, a zero output 150 during the time overlap of pulses 146 and 148, and an output 148A having reduced duration relative to pulse 148. As shown in FIG. 1C, if pulses 146 and 148 have the same duration and timing (i.e., overlap completely), the balun output 150 is zero due to the cancelling effect of the balun. It will be understood that FIGS. 1A-1C generally show the outputs/operation of a balun (e.g., any one of baluns 111-118), but the pulses 146, 148, 146A, 146B, etc., do not necessarily correspond directly to the pulses utilized during deskewing of device 1.

Figure 2:
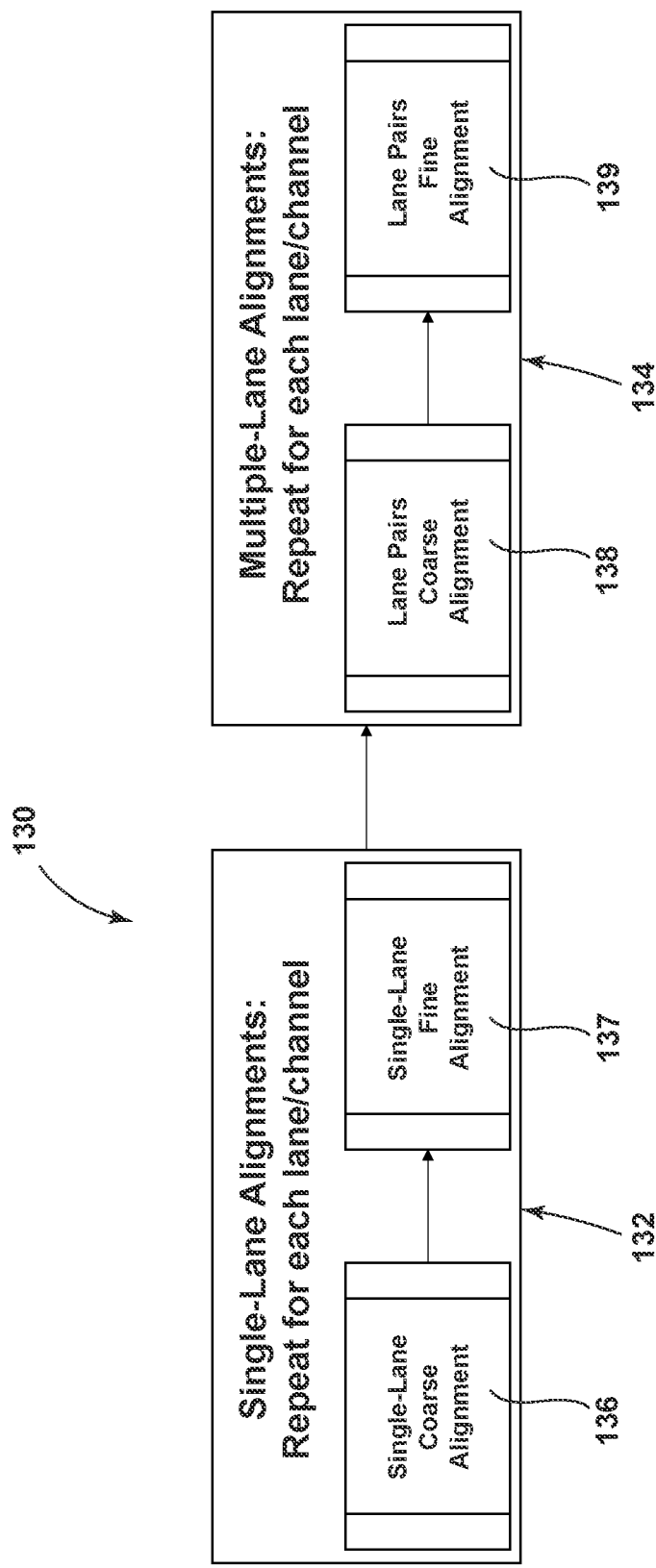
FIG. 2 is a flowchart showing a deskewing process according to one aspect of the present disclosure.

FIG. 2 is a flowchart showing an overview of a deskewing process 130 according to an aspect of the present application. Deskewing process 130 generally includes single-lane alignment 132 and multiple lane alignments 134 for pairs of lanes. As discussed above, differential channel pair 121 and 122 are combined to form lane 141, differential channel pair 123 and 124 are combined to form lane 142, differential channel pair 125 and 126 are combined to form lane 143, and differential channel pair 127 and 128 are combined to form lane 144. Pairs of transmitters 101-108 (FIG. 1) are interconnected with pairs of baluns 111-118 to form differential channel pair 121-128. For example, FPGA transmitters 101 and 102 are interconnected with baluns 111 and 112 to form a first lane 141 with differential channel pair 121, 122 driving a first optical driver 41. Similarly, FPGA transmitters 103 and 104 form a second lane 142 (corresponding to channel pair 123, 124), FPGA transmitters 105 and 106 form a third lane 143 (corresponding to channel pair 125, 126), and FPGA transmitters 107 and 108 correspond to a fourth lane 144 (corresponding to channel pair 127, 128).

The single-lane alignment 132 (FIG. 2) includes a single-lane coarse alignment 136 that is executed for each lane followed by a single-lane fine alignment 137 that is conducted for each lane following the coarse alignment. After the single-lane alignments 132 are repeated for each lane, multiple-lane alignment 134 is then conducted for pairs of lanes. In particular, for each pair of lanes, a coarse alignment 138 is executed, followed by a fine alignment 139. The pairs of lanes may comprise, for example, a first pair of lanes (lanes 141, 142), and a second pair of lanes (lanes 143, 144). The coarse and fine alignment steps 138 and 139 are repeated for all pairs of lanes to complete the process.

Figure 3:
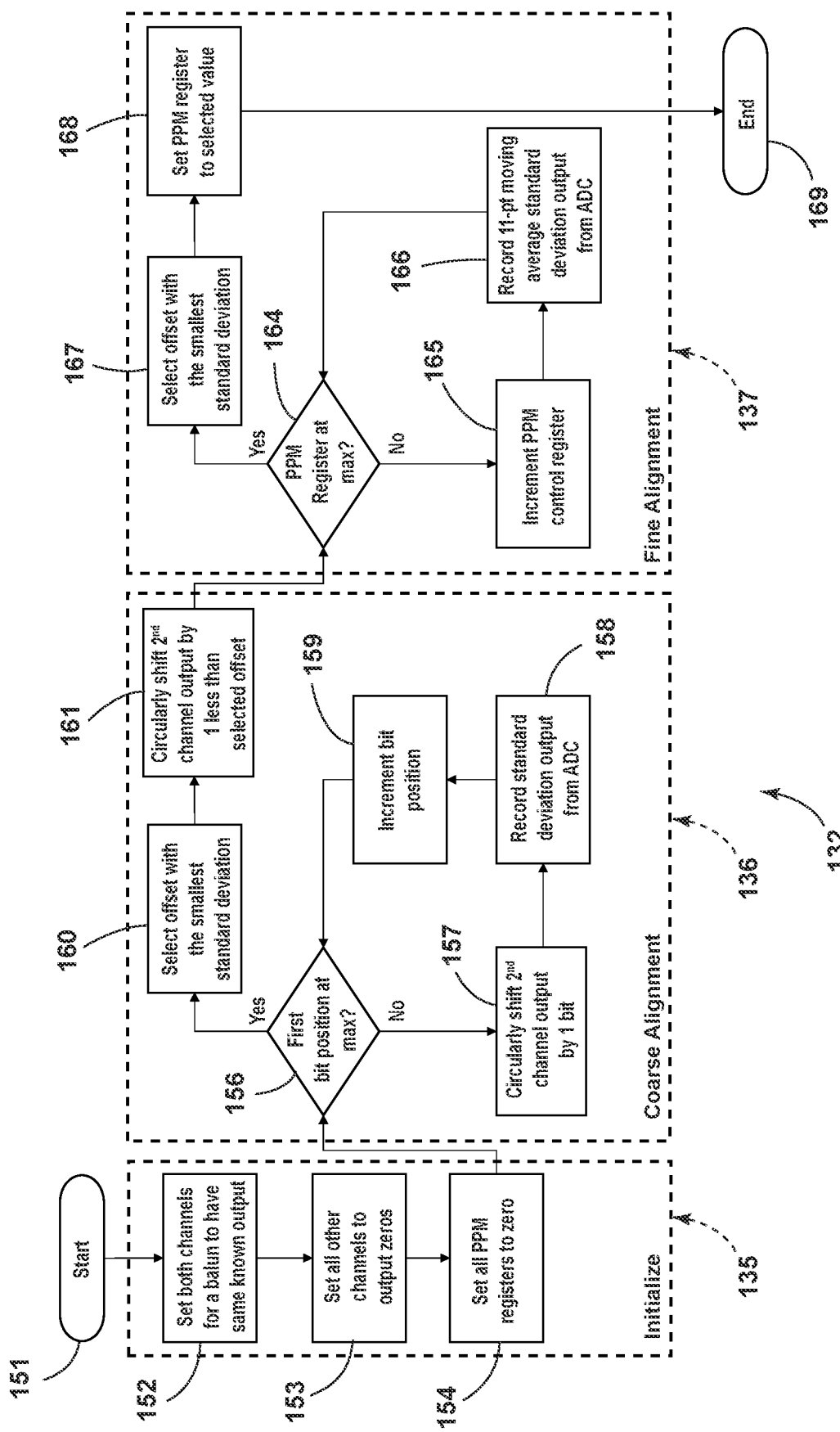
FIG. 3 is a flowchart showing initialization, coarse alignment, and fine alignment of a single lane of the device of FIG. 1.

With further reference to FIG. 3, the single-lane alignment process 132 includes initialization 135, coarse alignment 136, and fine alignment 137. After start 151, initialization 135 includes setting both channels for a balun 111-118 to have the same known output. At 153, all other channels are set to output 0s, and all PPM registers corresponding to the lane undergoing alignment are set to zero at 154. It will be understood that steps 152-154 do not necessarily need to be executed in the sequence illustrated in FIG. 3.

The coarse alignment 136 of process 132 includes determining if the position of the first bit of the output pulse is at maximum delay at step 156. Thus, if the total length of the output sequence is, for example, 544 bits (32 1s and 512 0s), the position of the first bit of the pulse is initially one. As discussed below, each time the loop formed by steps 156, 157, 158, and 159 is executed, the pulse is shifted (e.g., by one bit) and the position of the first bit increases by one until the first bit position reaches a maximum value (e.g., 513) and the process then proceeds from step 156 to step 160. It will be understood that all bits in a pulse are generally shifted simultaneously, and the maximum bit position (step 156) could be any of the bits in a pulse because all bits in a pulse will be at a maximum (e.g., 513-544) on the last execution of the loop formed by steps 156, 157, 158, and 159. If not, the second channel output is circularly shifted by one bit at 157, thereby increasing the delay, and the standard deviation output from the ADC 71, 72, 73, or 74 is recorded at 158. The bit position is then incremented at 159, and step 156 is then repeated until the first bit position is at a maximum. Once the first bit position is at a maximum at step 156, the process proceeds to step 160, which includes selecting the offset with the smallest standard deviation, followed by circularly shifting the second channel output by one bit less than the selected offset at 161. It will be understood that the second channel output could be circularly shifted more than one bit at step 161. Specifically, the standard deviation will tend to follow a "V" shape, with the smallest standard deviation (step 160) occurring at the vertex of the "V". Thus, the circular shifting at step 161 selects a relative timing between the first and second channels that is just prior to the optimum timing offset determined by the coarse alignment 136, and this offset (just prior to the coarse minimum) is used as a starting point for the fine alignment 137.

During the fine alignment 137, the initial offset from coarse alignment 136 is evaluated to determine if the PPM register is at a maximum value (maximum possible shift) at step 164. As noted above, the fine alignment 137 may utilize the TX phase interpolator PPM controller section 15 of the FPGA 10 and the PPM registers 16. Also, it will be understood that the maximum possible PPM register shift is limited to a limited range of timing shifts between the two channels being aligned in FIG. 3, but the increments of step 165 are less than the bit shifts of step 159. For example, the coarse alignment 146 may align the two channels within two bits (+/−) of the original coarse 544 bit pulse, and the fine alignment 137 may increment the PPM register in very small steps whereby the range of alignments from the original coarse alignment corresponding to four coarse alignment bits is divided into a large number of fine alignment increments. If the PPM register is not at a maximum value (step 164), the process 137 proceeds to step 165, and the PPM control register is incremented. It will be understood that the control register is incremented in steps that are smaller than the bit increments of step 159, and the loop formed by steps 164, 165, and 166 therefore provides a more accurate alignment than the coarse alignment 136. At step 166, the 11-point moving average standard deviation output from the ADC is recorded and the process then returns to step 164. Once the PPM register has reached a maximum value, the process proceeds to step 167, and the offset with the smallest standard deviation is selected. At step 168, the PPM register is set to the selected value, and the process ends at 169.

The process 132 of FIG. 3 is repeated for each lane until fine alignment for each lane 141-144 (FIG. 1) corresponding to optical drivers 41-44, respectively, is completed.

Figure 4:
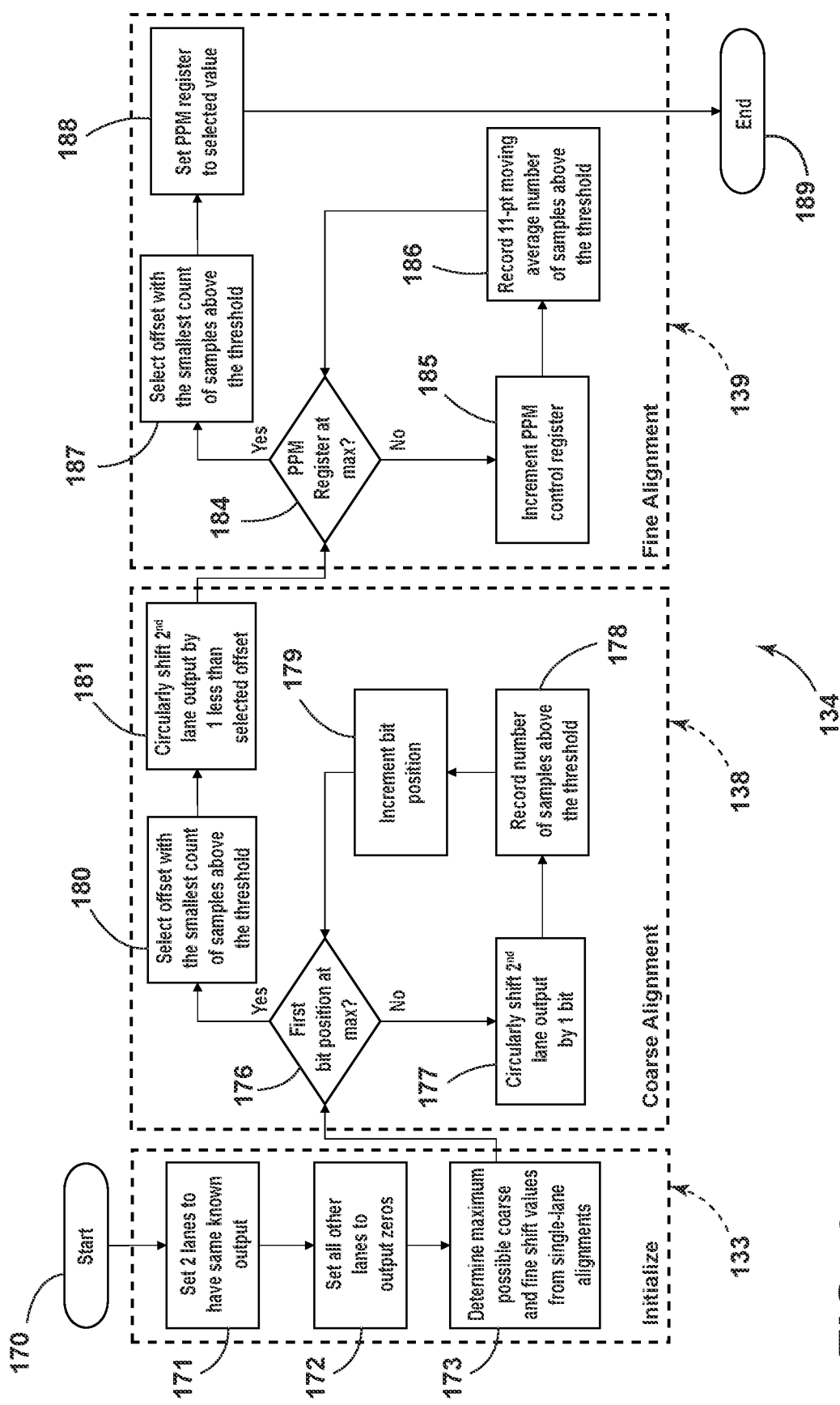
FIG. 4 is a flowchart showing time alignment of multiple lanes of the device of FIG. 1.

With further reference to FIG. 4, the multiple lane alignment process 134 for pairs of lanes includes initialization 133, coarse alignment 138, and fine alignment 139. Initialization 133 occurs after start 170, and includes setting two lanes (e.g., lanes 141, 142) to have the same known output at 171, and setting all other lanes (e.g., lanes 143, 144) to output zeros at step 172. At step 173, the maximum possible coarse and fine shift values from single-lane alignments are determined.

Following initialization 133, the process 134 then proceeds to step 176 of coarse alignment 138. At step 176, it is determined if the first bit position is at a maximum value. If not, the process continues to step 177, and the second lane output is circularly shifted by one bit. The number of samples above a selected threshold is then recorded at step 178. The threshold is preferably chosen to be 50% (or about 50%) between the sample minimum and maximum (i.e., about halfway between the minimum and maximum pulse amplitudes). It will be understood that the pulse amplitude is dependent on the system setup. Drive strength of the transmitter, attenuation on the optical path, ADC resolution, or other variables may affect the pulse amplitude. In general, there are at least two ways to determine the pulse amplitude prior to step 178. First, it may be determined empirically by doing a one-time collection of ADC samples, searching for the pulse in the collected data, and setting the threshold to half the amplitude. A more general way is to collect the ADC samples at each alignment attempt and have the algorithm calculate the halfway point between the lowest and highest ADC samples. The units of the pulse amplitude are in terms of ADC counts. For an 8-bit ADC with a 5V dynamic range, each count would correspond to a $5/(2^8) \approx 19.5$ mV unit. However, the present disclosure is not limited to a specific percentage or value, and any suitable threshold may be selected.

The bit position is then incremented at 179, and the process again returns to step 176. During the coarse alignment 138, the same pattern (32-1s/512-0s) is used only for the positive channels of the two lanes being aligned, and the other two channels are set to all 0s. In general, the coarse alignment 138 involves a bit-shift sweep that is executed on one of the positive channels until the pattern wraps around, and a record of pulse widths is created at each step by counting the number of samples above the threshold (step 178). The pulses from the two channels will eventually overlap, creating a minimum in the record, which is the optimum alignment. At step 180, the process includes choosing that optimum alignment, and backs up one or more steps by circularly shifting the second positive channel output by one or more steps less than the selected offset at step 181.

The optimum alignment (less one or more steps) is then utilized as an input at step 184 of fine alignment 139. If, at step 184, the PPM register is not at a maximum value, the process continues to step 185, and the PPM control register is incremented, and the 11-point moving average number of samples above the threshold is recorded at step 186. The process then returns to step 184 until the PPM register is at a maximum value. At step 187, the offset with the smallest count of samples above the threshold is selected, and the PPM register is set to the selected value at 188. The process then ends at 189. It will be understood that the fine alignment 139 utilizes the phase interpolator PPM controller 15 (FIG. 1) and PPM registers 16 of FPGA 10. Commercially available FPGAs 10 may include PPM controller 15 and PPM register 16, and the details of their operation are not therefore included herein.

The process 134 of FIG. 3 is repeated for each lane pair until fine alignment for each lane pair 141-144 (FIG. 1) corresponding to optical drivers 41-44, respectively, is completed. Also, it will be understood that the lanes may be paired in various ways in a multiple lane alignment 134 process (FIGS. 2 and 4). Thus, the first pair of lanes of alignment 134 could be lanes 141 and 142, and the second pair of lanes could be lanes 143 and 144. Alternatively, lane 141 could be an "anchor" lane that is initially aligned with lane 142 in the process of FIG. 4, and lane 141 could then be paired with lane 143 in the process of FIG. 4, and the process of FIG. 4 could then be implemented pairing lane 141 with lane 144.

Figure 4A:
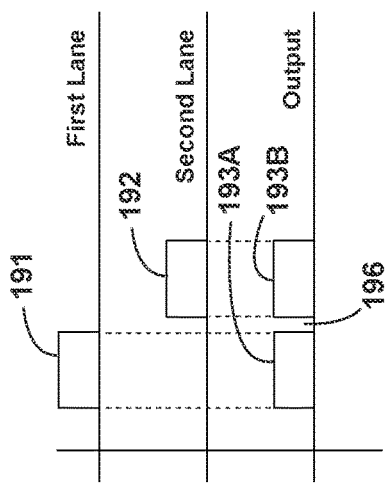
FIG. 4A is a graph showing an output for first and second lanes when implementing the process of FIG. 4.
Figure 4B:
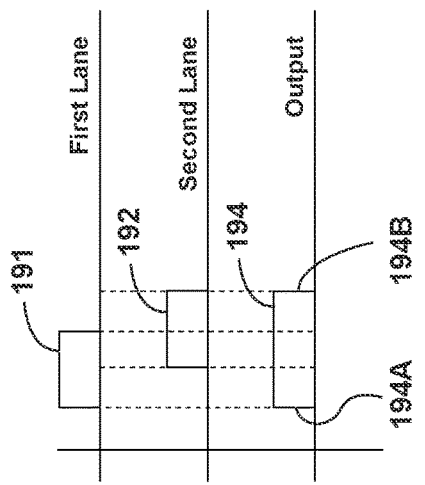
FIG. 4B is a graph showing an output for first and second lanes when implementing the process of FIG. 4.
Figure 4C:
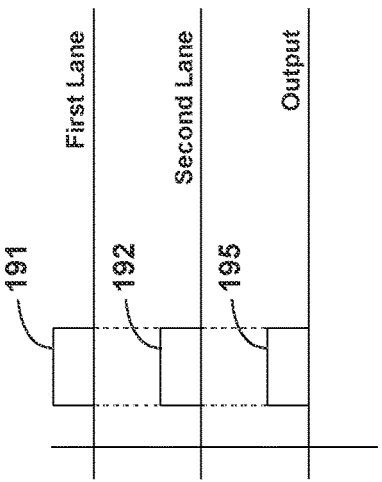
FIG. 4C is a graph showing an output for first and second lanes when implementing the process of FIG. 4.

With further reference to FIGS. 4A-4C, during the multi-lane coarse alignment 138 (FIG. 4), balun canceling can no longer be relied on to effect alignment of the four channels, resulting in the use of a threshold as discussed above. Specifically, with reference to FIG. 4A, if a first lane pulse 191 precedes second line pulse 192, the combined output is two separate pulses 193A and 193B with a gap 196 between the output pulses 193A and 193B. With reference to FIG. 4B, if pulses 191 and 192 of the first and second lanes overlap, the result is a single output pulse 194 having a leading edge 194A corresponding to leading edge of pulse 191 and a trailing edge 194B corresponding to the trailing edge of pulse 192. With reference to FIG. 4C, if pulses 191 and 192 of the first and second lanes, respectively, are aligned (and have the same duration), the output pulse 195 is identical to both pulses 191 and 192. In general, FIG. 4C illustrates complete overlap of the pulses 191 and 192 from the first and second lanes, which corresponds to a minimum number of samples above a threshold (i.e., step 180) of FIG. 4.

An external controller (not shown) may be configured to execute the deskewing process described above upon startup (or other suitable criteria) of system 1. Alternatively, FPGA 10 may be configured to implement the deskewing process upon startup (or other suitable criteria) of system 1.

Also, although a process according to an aspect of the present disclosure preferably includes single-lane coarse alignment 136 (FIG. 2) followed by single-lane fine alignment 137 for each lane, other variations are possible. For example, if fine alignment is not required for a particular application, the process could include only coarse alignment. Similarly, coarse alignment of lane pairs 138 (FIG. 2) does not necessarily need to be followed by fine alignment of lane pairs 139 if fine alignment of lane pairs is not required for a particular application. Also, although fine alignment 137 and 139 of single lanes and lane pairs, respectively, may be implemented utilizing a PPM controller 15 and PPM registers 16 of known FPGAs, fine alignment 137 and/or 139 could be accomplished by other means (e.g., an external controller (not shown) that is operably coupled to FPGA 10).

Furthermore, it will be understood that the deskewing process is not limited to a single FPGA 10. For example, two FPGAs having four transmitters each could be operably connected to a single clock 5, and the deskewing process of FIGS. 2-4 could be applied to the two FPGAs to align all the outputs. Similarly, two FPGAs having eight transmitters could be operably connected to a single clock and the outputs of the FPGAs could be aligned.

Also, it will be understood that the pulse width and bit-shifting is not limited to the examples described above.

Although pulses comprising 512 0s and 32 1s are suitable, the number of 0s and 1s is not critical, and pulses including other numbers of 0s and is (e.g., 512 0s and 64 1s, respectively) may be utilized. Virtually any suitable pulses may be utilized. Similarly, although single bit shifts are presently preferred, bit shifts of 2, 3, or more bits may be utilized.

What is claimed is:

1. A method of deskewing Field Programmable Gate Array (FPGA) transmitter channels driving an optical Quadrature Phase Shift Keying (QPSK) modulator of an optical transceiver having a plurality of optical modulators having optical transmitter ports and a plurality of optical receiver ports, wherein each optical receiver port is operably connected to an optical receiver that is, in turn, operably connected to an Analog-to-Digital Converter (ADC) providing electrical input signals to the FPGA, and wherein the FPGA includes a plurality of transmitter phase interpolator Parts-Per-Million (PPM) controllers and PPM registers and a plurality of FPGA transmitters, each transmitter pair defining a channel pair and producing positive and negative components of a lane providing electrical output signals, the method comprising:

operably coupling pairs of FPGA transmitters to pairs of baluns to form a passive balun network, whereby the positive terminals of each pair of FPGA transmitters are coupled to 0° and 180° inputs of a first balun of each pair of baluns, and negative terminals of each pair of FPGA transmitters are coupled to 0° and 180° inputs of a second balun of each pair of baluns;

providing an optical loopback path from the optical transmitter ports to corresponding optical receiver ports;

operably coupling outputs of each balun of each pair of baluns to inputs of an optical modulator whereby each optical modulator is driven by a pair of FPGA transmitters via a pair of baluns to define a lane;

forming a single virtual ADC using the FPGA by summing the absolute values of all ADCs whereby the single virtual ADC provides a plurality of samples;

for each lane, perform coarse time alignment of optical signals from the optical modulators followed by fine time alignment of optical signals from the optical modulators;

selecting pairs of lanes, and, for each pair of lanes, perform coarse time alignment followed by fine time alignment;

wherein initialization for coarse time alignment for each lane includes setting outputs of the transmitter pair to a same known value and setting outputs of all other transmitters to zero, and setting all PPM registers of the FPGA corresponding to the transmitters undergoing alignment to zero;

and wherein coarse time alignment of each lane includes repeatedly circularly shifting a second channel output by at least one bit relative to a first channel output to determine a selected offset having a minimum standard deviation, and circularly shifting the second channel output back by at least one circular shift from the selected offset to provide a coarse alignment shift;

and wherein fine alignment of each lane includes utilizing the coarse alignment shift in the transmitter phase interpolator PPM controllers to determine an offset having the smallest deviation, followed by setting the PPM register to the offset having the smallest deviation;

and wherein coarse time alignment and fine time alignment are conducted for each lane whereby each pair of FPGA transmitters is aligned and corresponds to XI: X-polarity in-phase, XQ: X-polarity quadrature, YI: Y-polarity in-phase, and YQ: Y-polarity quadrature;

and wherein coarse time alignment for each pair of lanes includes initialization, the initialization including setting a pair of lanes to have a same known output, setting all other lanes to output zeros, and determining the maximum possible coarse and fine shift values from the single-lane alignments, and wherein coarse time alignment for each pair of lanes further includes selecting a threshold and executing a bit-shift sweep on a selected pair of lanes until the pattern wraps around, wherein a record of pulse widths is created at each step by counting the number of samples above the threshold;

and wherein a minimum number of samples above the threshold occurs when pulses from the two channels overlap;

and wherein coarse time alignment for each pair of lanes further includes selecting an optimum shift at which there is a minimum number of samples above the threshold;

and wherein fine time alignment of each pair of lanes includes adjusting the phase interpolator PPM channels and recording samples above the threshold, wherein only the positive terminals of two of the four channels are driven at a time, and an optimum alignment is selected at which a minimum number of samples below the threshold occurs;

and wherein coarse and fine time alignment are repeated for all lanes.

2. The method of claim 1, wherein:
the FPGA is configured to perform coarse alignment for each lane.

3. The method of claim 2, wherein:
the FPGA is configured to perform coarse alignment for each pair of lanes.

4. The method of claim 1, wherein:
the threshold for coarse alignment for each pair of lanes is about 50% between a sample minimum and a sample maximum, wherein the sample minimum comprises a minimum number of samples above the threshold, and the sample maximum comprises a maximum number of samples above the threshold.

5. The method of claim 1, wherein:
the FPGA includes eight transmitters, wherein first and second transmitters correspond to a first lane, third and fourth transmitters correspond to a second lane, fifth and sixth transmitters correspond to a third lane, and seventh and eighth transmitters correspond to a fourth lane.

6. The method of claim 1, including:
configuring the FPGA to perform, for each lane upon power-up of the FPGA, coarse time alignment of optical signals from the optical modulators followed by time alignment of optical signals from the optical modulators, and coarse alignment followed by fine alignment for pairs of lanes.

7. The method of claim 1, including:
operably decoupling the optical loopback path; and
utilizing the optical transceiver to transmit optical signals that are not received by the optical receiver ports.

8. The method of claim 1, wherein:
the optical loopback paths comprise one or more optical fibers.

9. The method of claim 1, wherein:
coarse time alignment of each lane includes causing the pair of FPGA transmitters of each lane to output pulses comprising a plurality of 1s and a plurality of 0s.

10. A method of deskewing Field Programmable Gate Array (FPGA) transmitter channels driving an optical Quadrature Phase Shift Keying (QPSK) modulator of an optical transceiver having a plurality of optical modulators having optical transmitter ports and a plurality of optical receiver ports, wherein each optical receiver port is operably connected to an optical receiver that is, in turn, operably connected to an Analog-to-Digital Converter (ADC) providing electrical input signals to the FPGA, and wherein the FPGA includes a plurality of transmitter phase interpolator Parts-Per-Million (PPM) controllers and PPM registers and a plurality of FPGA transmitters, each transmitter pair defining a channel pair and producing positive and negative components of a lane providing electrical output signals, wherein pairs of FPGA transmitters are coupled to pairs of baluns, each balun having a channel output whereby time offsets in pulses having substantially identical sequences of 1s and 0s of each FPGA transmitter of each transmitter pair cause differences in channel outputs of each balun of each pair whereby the differences in channel outputs are related to a degree to which the channel outputs are misaligned, the method comprising:
performing a single-lane coarse alignment for each lane by causing the FPGA transmitters of each pair to generate pulses having substantially identical sequences of 1s and 0s, repeatedly bit-shifting pulses of a second channel output of each pair relative to a first channel output of each pair to form a plurality of offsets and corresponding differences in channel outputs, and selecting an optimum coarse offset corresponding to differences in channel outputs indicating that the first and second channels are coarsely aligned; and
performing a single-lane fine time alignment for each lane utilizing the optimum coarse offset and the PPM controllers and PPM registers of the FPGA.

11. The method of claim 10, including:
performing multiple-lane coarse alignment for pairs of lanes by bit-shifting a second lane output relative to a first lane output to form a plurality of offsets and recording a number of samples above a threshold for each offset, and selecting an optimum multi-lane coarse offset corresponding to a smallest number of samples above the threshold.

12. The method of claim 11, including:
performing multiple-lane fine alignment for pairs of lanes utilizing the optimum multi-lane coarse offset and the PPM controllers and PPM registers of the FPGA.

13. The method of claim 10, wherein:
the ADC comprises a plurality of ADCs that produce samples in response to signals from the optical receivers; and including:
combining samples from the plurality of ADCs to form a single virtual ADC; and
utilizing samples from the single virtual ADC to determine differences in channel outputs.

14. The method of claim 13, wherein:
the differences in channel outputs comprise standard deviations.

15. The method of claim 14, wherein:
the optimum coarse offset corresponds to a minimum standard deviation.

16. The method of claim 15, wherein:
the single-lane fine alignment is initiated at an offset that is not equal to the optimum coarse offset.

17. The method of claim 10, including:
during single-lane coarse alignment, causing the FPGA transmitters of each transmitter pair to generate pulses, each pulse having a plurality of is that are not separated by 0s, and a plurality of 0s that are not separated by 1s, and wherein a number of 0s of each pulse is greater than a number of is of each pulse.

18. A method of deskewing Field Programmable Gate Array (FPGA) transmitter channels driving an optical Quadrature Phase Shift Keying (QPSK) modulator of an optical transceiver having a plurality of optical modulators having optical transmitter ports and a plurality of optical receiver ports, the FPGA including a plurality of pairs of transmitters, each pair defining a lane, the method comprising:
simultaneously driving a pair of transmitters of the FPGA with substantially identical first and second pulses, wherein the first and second pulses each comprise a plurality of 1s and 0s defining a pulse length;
combining outputs of the pair of transmitters such that a combined output of the pair of transmitters varies as timing of the first pulse is changed relative to the second pulse due to bit-shifting of the first pulse relative to the second pulse;
utilizing the combined output of the pair of transmitters to drive an optical modulator;
repeatedly bit-shifting the first pulse relative to the second pulse for the length of the first pulse to define a plurality of offsets of the first pulse relative to the second pulse;
recording outputs of the optical modulator as the first pulse is bit-shifted relative to the second pulse for each offset;
selecting an optimum coarse offset utilizing the outputs of the optical driver;
utilizing the optimum coarse offset to determine an initial alignment to be used for fine alignment of the pair of transmitters;
utilizing a transmitter phase interpolator Parts-Per-Million (PPM) controller of the FPGA to determine a fine alignment of the pair of transmitters;
determining the optimum coarse alignment and a fine alignment for each lane; and
conducting multiple-lane coarse alignment followed by multiple-lane fine alignment for pairs of lanes until all lanes are finely aligned.

19. The method of claim 18, wherein:
multiple-lane coarse alignment includes bit-shifting a second lane output relative to a first lane output to form a plurality of offsets and recording a number of samples above a threshold for each offset, and selecting an optimum multi-lane coarse offset corresponding to a smallest number of samples above the threshold.

20. The method of claim 19, including:
operably coupling pairs of FPGA transmitters to pairs of baluns to form a passive balun network, whereby the positive terminals of each pair of FPGA transmitters are coupled to 0° and 180° inputs of a first balun of each pair of baluns, and negative terminals of each pair of FPGA transmitters are coupled to 0° and 180° inputs of a second balun of each pair of baluns;
providing an optical loopback path from the optical transmitter ports to corresponding optical receiver ports;

operably coupling outputs of each balun of each pair of baluns to inputs of an optical modulator whereby each optical modulator is driven by a pair of FPGA transmitters via a pair of baluns to define a lane; and forming a single virtual ADC using the FPGA by summing the absolute values of all ADCs whereby the single virtual ADC provides a plurality of samples.

* * * * *